United States Patent
Sarrus et al.

(10) Patent No.: US 9,450,396 B2
(45) Date of Patent: Sep. 20, 2016

(54) DC CURRENT INTERRUPTION SYSTEM ABLE TO OPEN A DC LINE WITH INDUCTIVE BEHAVIOUR

(75) Inventors: Franck Sarrus, Saint Laurent de Mure (FR); Florent Balboni, Lyons (FR); Dominique Tournier, Lyons (FR)

(73) Assignee: MERSEN FRANCE SB SAS, Saint-Bonnet-de-Mure (FR)

( * ) Notice: Subject to any disclaimer, the term of this patent is extended or adjusted under 35 U.S.C. 154(b) by 304 days.

(21) Appl. No.: 13/824,727

(22) PCT Filed: Jul. 2, 2012

(86) PCT No.: PCT/EP2012/062838
§ 371 (c)(1),
(2), (4) Date: Jan. 2, 2014

(87) PCT Pub. No.: WO2013/004662
PCT Pub. Date: Jan. 10, 2013

(65) Prior Publication Data
US 2014/0126098 A1 May 8, 2014

(30) Foreign Application Priority Data
Jul. 4, 2011 (FR) ...................................... 11 56020

(51) Int. Cl.
*H02H 3/20* (2006.01)
*H01H 33/59* (2006.01)

(52) U.S. Cl.
CPC ............. *H02H 3/20* (2013.01); *H01H 33/596* (2013.01)

(58) Field of Classification Search
USPC .......................................... 361/13, 14, 91.5
See application file for complete search history.

(56) References Cited

U.S. PATENT DOCUMENTS

| | | | | |
|---|---|---|---|---|
| 3,651,374 A * | 3/1972 | Faust | ................... | H01H 33/596 218/143 |
| 3,809,959 A * | 5/1974 | Pucher | ................. | H01H 33/596 361/13 |
| 4,414,601 A * | 11/1983 | Conroy, Jr. | ............ | H02H 3/044 361/94 |
| 5,305,174 A * | 4/1994 | Morita | ..................... | H02H 7/30 361/58 |
| 5,440,441 A * | 8/1995 | Ahuja | ...................... | H02H 3/06 361/62 |
| 5,666,254 A * | 9/1997 | Thomas | ................. | H02H 9/026 361/13 |
| 5,689,395 A * | 11/1997 | Duffy | ..................... | H02H 9/026 361/103 |
| 5,737,160 A * | 4/1998 | Duffy | ................... | H01H 33/161 361/3 |
| 5,793,586 A * | 8/1998 | Rockot | ................ | H01H 33/596 361/8 |

(Continued)

*Primary Examiner* — Thienvu Tran
*Assistant Examiner* — Angela Brooks
(74) *Attorney, Agent, or Firm* — Knobbe Martens Olson & Bear LLP

(57) ABSTRACT

The invention pertains to a DC current interruption system able to open a DC line with inductive behavior, comprising a primary mechanical breaker (S0), a secondary mechanical breaker (S1) and an electronic overvoltage protection circuit (B1, B2) comprising at least one transistor. The DC current interruption system of the invention furthermore comprises an electronic opening system (72, 76) comprising a passive circuit able to auto-bias the electronic protection circuit (B1, B2) upon the opening of said primary mechanical breaker (S0), so as to trigger a switching of said at least one transistor (M1, M2, IG1) making it possible to limit the voltage and the current in the DC line, total interruption of said DC line being obtained by subsequent opening of said secondary mechanical breaker (S1).

9 Claims, 5 Drawing Sheets

(56) References Cited

U.S. PATENT DOCUMENTS

| | | | | |
|---|---|---|---|---|
| 5,805,393 A * | 9/1998 | Thomas | H02H 9/026 | 361/13 |
| 6,040,969 A * | 3/2000 | Winch | H02H 11/002 | 307/127 |
| 6,437,955 B1 * | 8/2002 | Duffy | H02H 3/025 | 361/113 |
| 6,741,435 B1 | 5/2004 | Cleveland | | |
| 7,778,000 B2 * | 8/2010 | Scheffler | H02H 3/023 | 361/117 |
| 7,821,756 B2 * | 10/2010 | Chishima | H02H 3/087 | 361/93.7 |
| 8,614,866 B2 * | 12/2013 | Billingsley | H01H 9/542 | 361/8 |
| 8,792,220 B2 * | 7/2014 | Wang | H02H 3/20 | 361/79 |
| 8,810,985 B2 * | 8/2014 | Demetriades | H02H 3/023 | 361/102 |
| 8,837,093 B2 * | 9/2014 | Panousis | H01H 33/596 | 361/13 |
| 9,148,011 B2 * | 9/2015 | Magnusson | H01H 9/542 | |
| 2003/0067723 A1 * | 4/2003 | Suzui | H02H 3/337 | 361/42 |
| 2003/0193770 A1 * | 10/2003 | Chung | H01H 9/542 | 361/118 |
| 2006/0120007 A1 * | 6/2006 | Legatti | H01H 47/32 | 361/160 |
| 2006/0192390 A1 * | 8/2006 | Juanarena Saragueta | F03D 9/002 | 290/44 |
| 2006/0224360 A1 * | 10/2006 | Kishimoto | B60L 3/0023 | 702/183 |
| 2008/0164961 A1 * | 7/2008 | Premerlani | H01H 1/0036 | 335/7 |
| 2008/0165457 A1 * | 7/2008 | Premerlani | H01H 59/0009 | 361/31 |
| 2009/0161277 A1 * | 6/2009 | Roesner | H02H 7/1227 | 361/87 |
| 2009/0201617 A1 * | 8/2009 | Yamaguchi | H01H 9/40 | 361/93.9 |
| 2010/0283328 A1 * | 11/2010 | Eggert | H02J 3/14 | 307/112 |
| 2011/0140530 A1 * | 6/2011 | Demetriades | H02J 3/36 | 307/77 |
| 2012/0007657 A1 * | 1/2012 | Naumann | H01H 9/542 | 327/434 |
| 2012/0218676 A1 * | 8/2012 | Demetriades | H01H 9/542 | 361/115 |
| 2012/0299393 A1 * | 11/2012 | Hafner | H01H 9/542 | 307/113 |
| 2012/0306264 A1 * | 12/2012 | Komma | B60R 25/00 | 307/9.1 |
| 2013/0027829 A1 * | 1/2013 | Antoniazzi | H02H 7/28 | 361/100 |
| 2013/0099533 A1 * | 4/2013 | Lugo | A47C 31/11 | 297/219.1 |
| 2013/0278078 A1 * | 10/2013 | Ohlsson | H01H 9/548 | 307/113 |
| 2014/0313626 A1 * | 10/2014 | Wang | H02H 9/04 | 361/91.2 |
| 2014/0332500 A1 * | 11/2014 | Pessina | H01H 33/04 | 218/4 |
| 2015/0022928 A1 * | 1/2015 | Mohaddes Khorassani | H02H 3/087 | 361/93.7 |
| 2015/0145349 A1 * | 5/2015 | Bausch | H01H 9/0016 | 307/135 |
| 2015/0318796 A1 * | 11/2015 | Dent | H02M 1/32 | 363/97 |

* cited by examiner

DC CURRENT INTERRUPTION SYSTEM ABLE TO OPEN A DC LINE WITH INDUCTIVE BEHAVIOUR

CROSS-REFERENCE TO RELATED APPLICATIONS

This application is the U.S. National Phase under 35. U.S.C. §371 of International Application PCT/EP2012/062838, filed Jul. 2, 2012, which claims priority to French Patent Application No. 11 56020, filed Jul. 4, 2011. The disclosures of the above-described applications are hereby incorporated by reference in their entirety.

The invention relates to a DC current interruption system able to open a DC line with inductive behaviour.

More generally, the field of the invention is the field of DC breakers.

DC breakers are widely used in various industrial, aeronautic and automobile applications or for energy distribution. They make it possible to obtain a full charge on a long distance DC line or bus, which therefore has an inductive behaviour, in order to insulate a source of energy from a network or a charge.

It is known that at high power, the opening of a DC line generates strong electric arcs caused by the energy stored in the electricity network. In order to interrupt these electric arcs, various solutions based on expensive and complex mechanical breakers are known in prior art.

Hybrid solutions implementing both an electronic portion with semiconductor base and a mechanical portion have been proposed.

The article "Micro-Arcing and Arc Erosion Minimization Using a DC Hybrid Switching Device" by J. Swingler and J. McBride, published in the journal IEEE Transactions on Components and Packaging Technologies, vol. 31, no. 2, published on 2 Jun. 2008, presents a hybrid breaker comprising a series of three mechanical breakers and a field effect transistor of the MOSFET type of which the function is to prevent the electric arc effect. For proper operation, the actuation of the mechanical breakers in this solution must be carried out according to a precise sequence which is an operating constraint. In addition, this solution is suited only for voltages around 40 Volts (V) and 2.5 Amperes (A), and therefore is not suited for applications with DC lines at a higher voltage.

Many applications, as for example photovoltaic applications, require voltages around 600V, and currents around 30 A.

It is desirable to overcome the disadvantages of prior art, and obtain a DC mechanical breaker that is simplified and that can be used in particular in a high voltage domain.

To this end, the invention has for purpose a DC current interruption system able to open a DC line with inductive behaviour, comprising a primary mechanical breaker, a secondary mechanical breaker and an electronic overvoltage protection circuit comprising at least one transistor. The DC current interruption system is characterised in that it further comprises an electronic opening system comprising a passive circuit able to auto-bias the electronic protection circuit upon the opening of said primary mechanical breaker, so as to trigger a switching of said at least one transistor making it possible to limit the voltage and the current in the DC line, with total interruption of said DC line being obtained by subsequent opening of said secondary mechanical breaker.

Advantageously, the electronic opening system takes over from the primary mechanical breaker and allows for the delayed self-biasing of the protection circuit which is able to absorb the energy released by the transient of the source, which makes it possible to carry out an interruption while still preventing any electric arc. The protection circuit makes it possible to substantially limit the current intensity, and consequently the actuation of the secondary mechanical breaker does not need to be synchronised with the actuation of the primary mechanical breaker, therefore there is no strong constraint in sequencing breakers. In the current interruption system according to the invention, simple and low-cost mechanical breakers are sufficient.

The DC current interruption system according to the invention can have one or several of the characteristics hereinbelow:

the electronic protection circuit comprises a plurality of field effect transistors mounted in parallel, able to switch to an ohmic mode in a first step after opening of said primary breaker, then to a breakdown mode in a second step when the voltage reaches a predetermined value;

the electronic protection circuit further comprises a breakdown balancing system, making it possible to operate said plurality of field effect transistors in breakdown mode quasi-simultaneously;

the breakdown balancing system comprises a resistor mounted in series with each field effect transistor;

the electronic protection circuit comprises a first block able to limit the voltage comprising at least one transistor of the first type, and a second block able to limit the current comprising at least one transistor of the second type;

the second block comprises, for each transistor of the second type, a resistor mounted in series with said transistor;

the DC current interruption system comprises two electronic opening systems, i.e. a first electronic opening system with fast self-biasing able to actuate said first block and a second electronic opening system with slow self-biasing able to actuate said second block, in such a way as to allow for, upon the opening of said primary mechanical breaker, a limitation of the voltage by said first block followed by a current limitation by said second block;

upon the opening of said primary breaker (S0), the following phases are sequenced:

implementation of said first block by the electronic opening system with fast self-biasing, said at least one transistor of the first type operating in ohmic mode, implementation of said second block by the electronic opening system with slow self-biasing, said at least one transistor of the first type being in non-passing mode, implementation of said first block when the voltage reaches a predetermined value, said at least one transistor of the first type operating in breakdown mode;

said transistor of the first type is a MOSFET transistor and said transistor of the second type is an IGBT transistor;

a said electronic opening system comprises at least one passive circuit comprised of a diode mounted in series with a capacitor, and a resistor mounted in parallel with said capacitor, and a number of transistors mounted in parallel in said protection circuit are determined according to the constraints in voltage, current and inductance of said DC line.

Other characteristics and advantages of the invention will appear in the description provided hereinbelow, for the purposes of information and is in no way limited, in reference to the annexed figures, among which:

Figure 9:
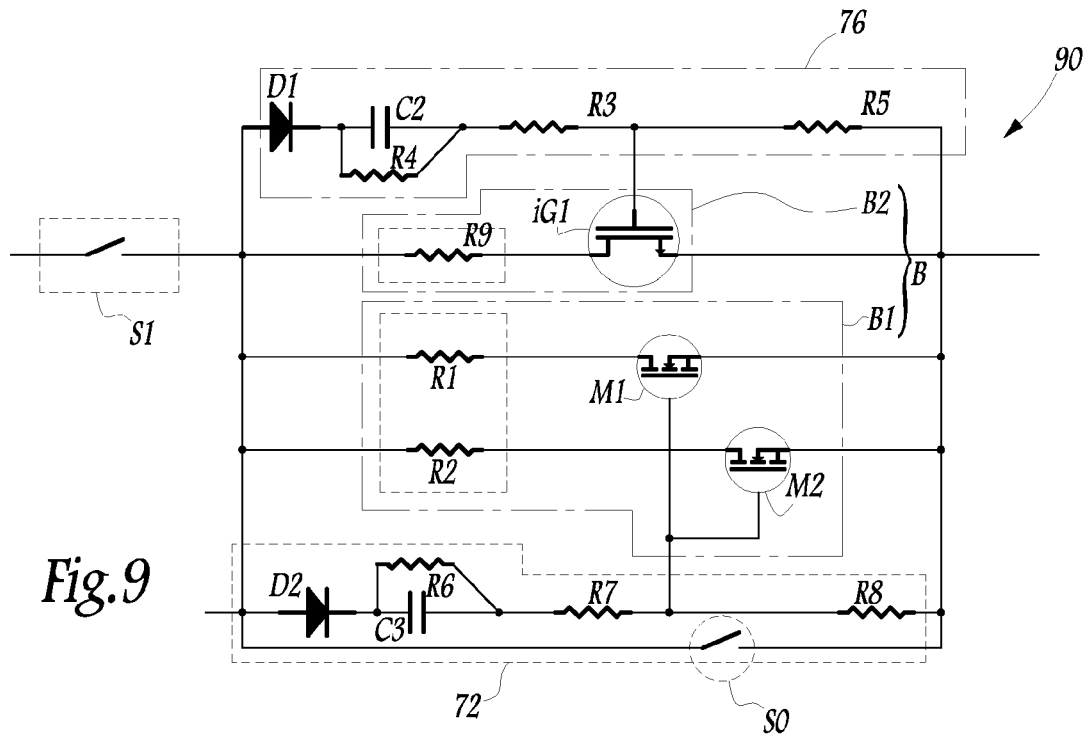
Figure 10:
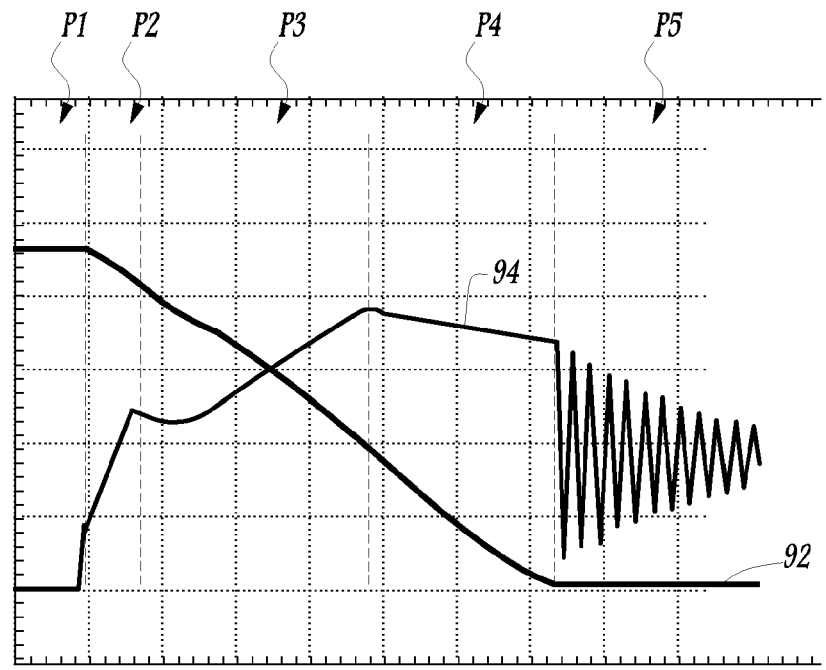
Figure 11:
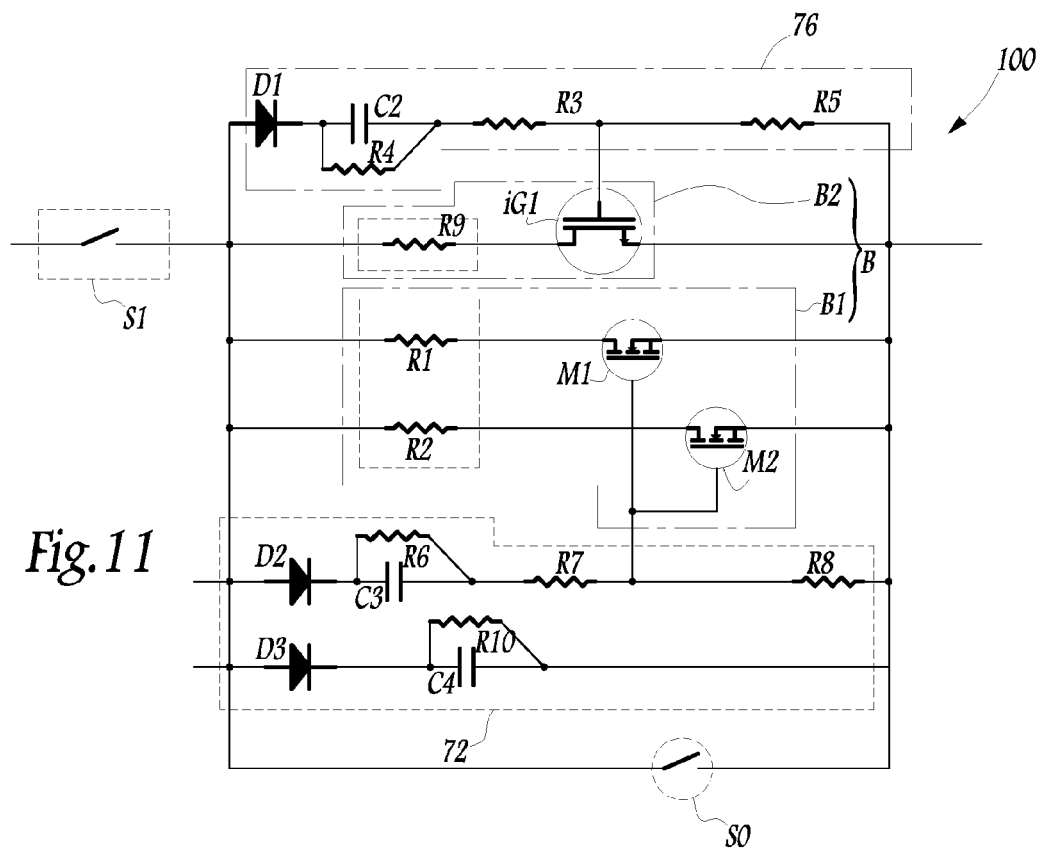

FIG. 9 is a diagram showing a fourth embodiment of a DC current interruption system according to the invention, FIG. 10 is a graph comprising curves that show the change in the current and voltage upon the actuation of the DC current interruption system according to the fourth embodiment for a 20V/2.5 A line, and FIG. 11 is a diagram showing a fifth embodiment of a DC current interruption system according to the invention.

A DC current interruption system with field effect transistors of the MOSFET type ("Metal Oxide Semiconductor Field Effect Transistor") is described in what follows. However, the invention is applied with any type of semiconductor component, and in particular with any type of field effect transistor.

The favoured application considered here is the use of the DC current interruption system of the invention in the framework of the production of photovoltaic current, generating a bus current or a 600V/30 A high voltage DC line. The invention however applies more generally with a large range of DC bus constraints, in a voltage range ranging from 20V to 900V (currently the maximum voltage for a component of the MOSFET), with the calibre in current being linked to the number of semiconductor components placed in parallel. The various components are dimensioned in relation to the target application, according to the constraints of the DC bus.

Figure 1:
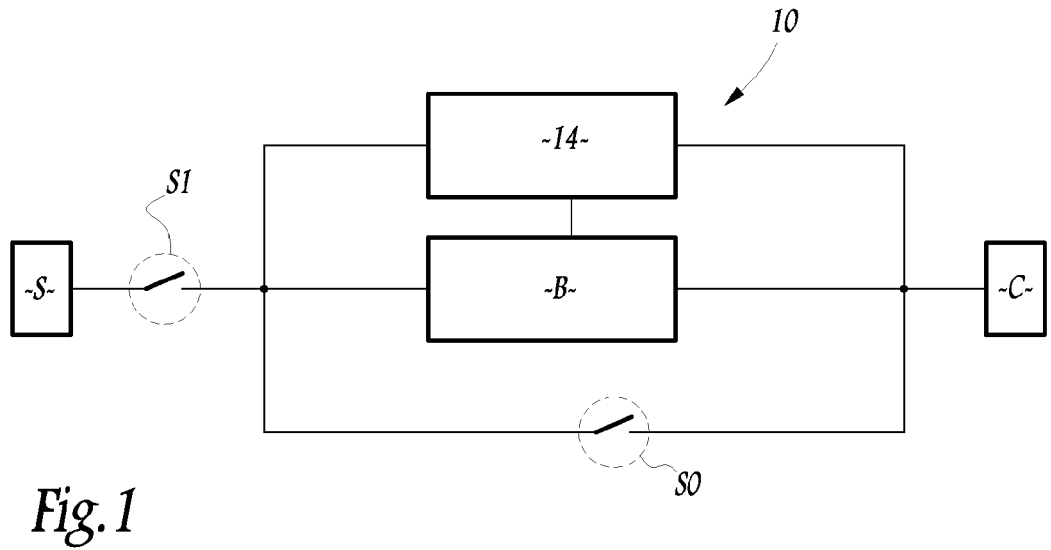
FIG. 1 is a block diagram of a DC current interruption system.

The DC current interruption system 10, referred hereinafter simply as interruption system, shown in FIG. 1, is able to open a DC line 12 between a source S and a charge C. This system comprises two mechanical breakers S0, S1, as well as an electronic opening system with a passive circuit 14 which plays the role of an electronic breaker with a delay for an overvoltage protection circuit B, which is a block comprising at least one semiconductor component or transistor.

When the primary breaker S0 is actuated, the current passes into the electronic opening system 14, which actuates via self-biasing the switching of the transistor or transistors of the protection circuit B which quickly reach their saturation regime, which triggers their opening and makes it possible to prevent any electric arc.

In addition, the protection circuit B limits the current to a value that is practically zero, which then allows the opening of the secondary breaker S1 for a total interruption.

Thanks to the electronic opening system 14 no external control device of the electronic protection circuit is required and the electric arc is avoided.

Figure 2:
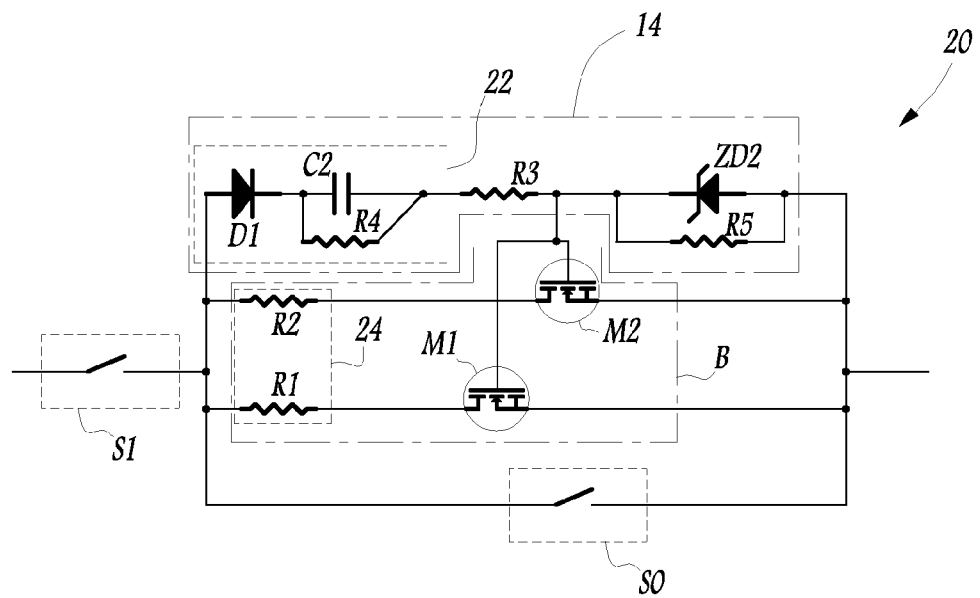
FIG. 2 is a diagram showing a first embodiment of a DC current interruption system according to the invention.

FIG. 2 shows a first embodiment of a DC current interruption system 20 with transistors of the MOSFET type. In the example of the figure the electronic opening system 14 comprises a passive circuit 22 comprised of a diode D1 mounted in series with a capacitor C2, and a resistor R4 mounted in parallel to the capacitor C2. A resistor R3 is mounted in series with the passive circuit 22.

The electronic opening system 14 shown in FIG. 2 further comprises a resistor R5.

The interruption system 20 further comprises a Zener ZD2 diode mounted in parallel to the resistor R5. This diode is optional and has for effect to protect the gate of the transistor against a temporary overvoltage which could cause its destruction.

The electronic protection circuit B comprises two MOSFET components M1 and M2 mounted in parallel, and resistors R1, R2 each mounted in series with one of the transistors.

The resistors form a balancing system 24 for sharing the energy between the two MOSFET components M1 and M2 in breakdown mode. Indeed, in practice, the breakdown voltage Vbr of a MOSFET component can be slightly different from the theoretical manufactured breakdown voltage. Even a slight difference between the breakdown voltages of MOSFET components mounted in parallel can have a substantial impact on the distribution of the energy.

Indeed, if for example the MOSFET M1 has a breakdown voltage that is higher than the MOSFET M2, the MOSFET M2 first switches to breakdown mode and absorbs all of the energy of the circuit, and no current passes through the MOSFET M1 at a higher breakdown voltage. In this case, there is no distribution of energy between the two MOSFET components, although the very objective of mounting several such components in parallel is to allow for the absorption of energy that is higher than that which can be supported by a single component.

In order to prevent the imbalance which can occur if the MOSFET components mounted in parallel do not have equal breakdown voltages in practice, resistors of a low value are placed on the drain side of each MOSFET component. For example resistors $R1=R2=1$ Ohms for respective components M1 and M2 having a theoretical breakdown voltage of Vbr32 900V and respective practical breakdown voltages of plus or minus 10V around the breakdown voltage are recommended.

As such, when the MOSFET component of which the breakdown voltage is the lowest enters into breakdown mode, its drain current increases significantly, and the voltage at the terminals of the corresponding balancing resistor is also largely increased. This voltage also applies for the parallel branch, which makes it possible to reach the breakdown voltage also in the second branch, and makes it possible to actuate the second MOSFET component in breakdown mode also.

The interruption system 20 having a passive capacitive circuit 22 and a plurality of MOSFET transistors mounted in parallel is adapted in order to limit the voltage and the current for a DC line with low constraints, having an inductance less than 3 mH (milli Henrys) and a current ranging up to 10 A.

FIGS. 3 to 6 show in detail the operation of the interruption system 20 of FIG. 2.

Figure 3:
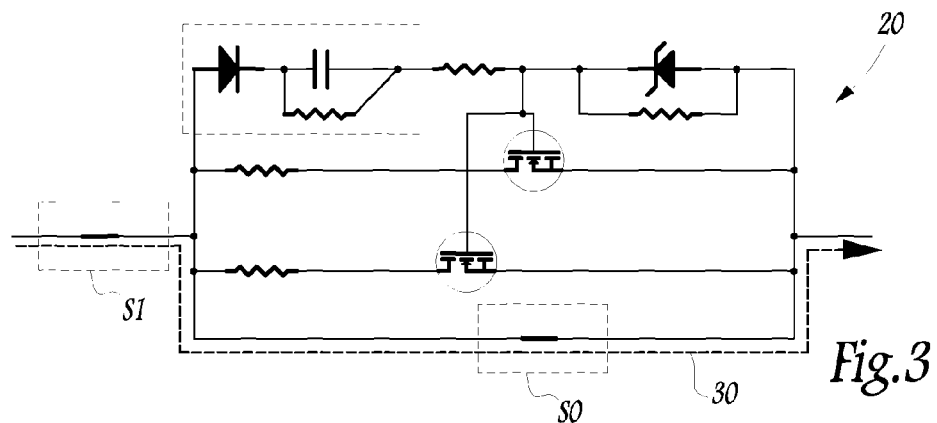
FIGS. 3 to 6 show the operation of the DC current interruption system of FIG. 2.

In nominal operation, such as is shown in FIG. 3, the two breakers S0 and S1 are closed, the components M1 and M2 are in blocked mode. The DC bus is closed, and the current is flowing according to the line 30 shown in FIG. 3.

Figure 4:
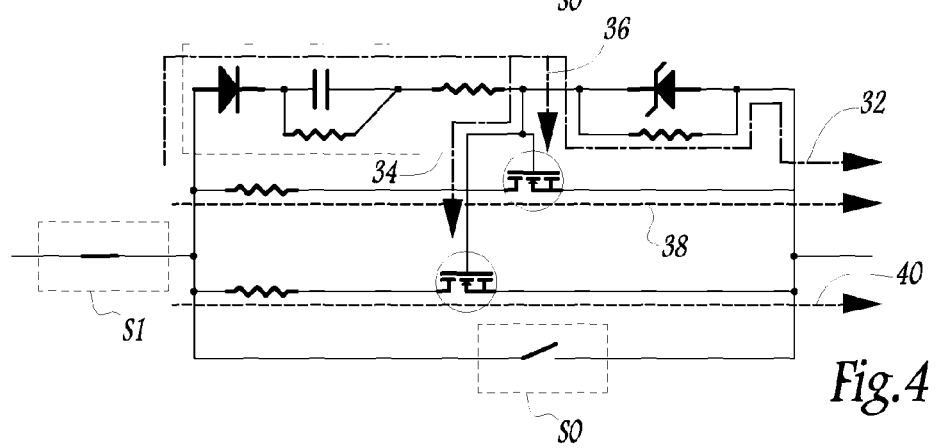

When the primary breaker S0 is open as shown in FIG. 4, and the secondary breaker S1 is maintained closed, the current is flowing according to the line 32 during the charge of the capacitive passive circuit, and the respective gates of the MOSFET components M1 and M2 are quickly charged via R3 according to the flow 34 and 36 (shown as dotted lines in FIG. 4e). The two transistors are passing in ohmic mode; the current is flowing according to the lines 38, 40 of FIG. 4 while the capacitive passive circuit continues to be charged. The choice of the values of R3, R5 and of C2 makes it possible to control this charging phase. For example R3=3 Ohms, R5=10 Ohms and C2=10 nF (nano Farads) are selected for a current of 5 A.

Figure 5:
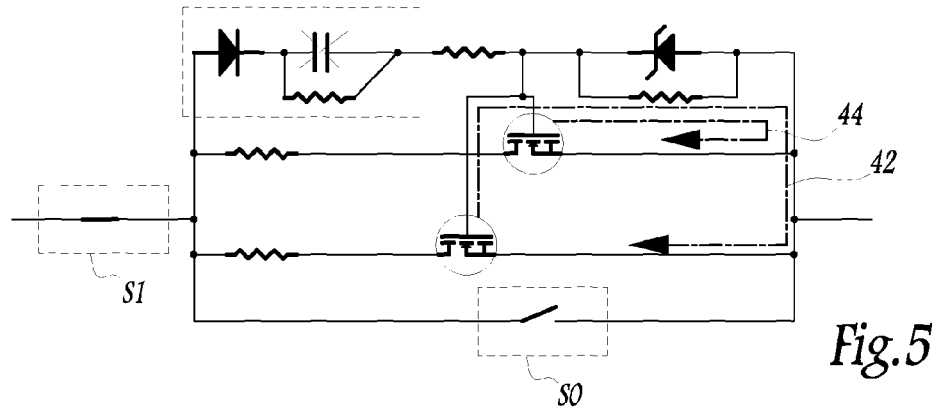

When the charge of the capacitor C2 is completed, the latter acts as an open breaker, as shown in FIG. 5. The gates of the MOSFET components discharge via R5 causing an increase in the voltage Vds for each MOSFET, then the MOSFET components switch to breakdown mode, shown as dotted lines 42 and 44 in FIG. 5. The diode D1 has for effect to prevent substantial oscillations of the voltage Vds after the breakdown event.

Figure 6:
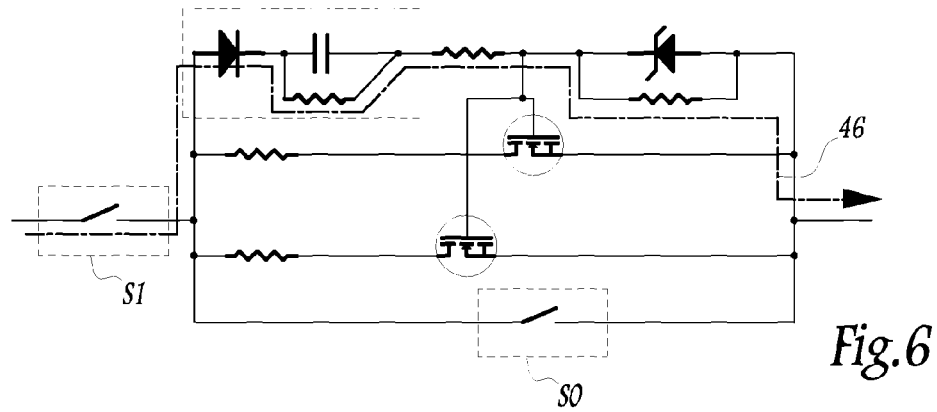

After the breakdown event of the two MOSFET transistors, a low residual current continues to flow, as shown in FIG. 6, according to the line 46 through the resistors R6-R3-R5. The secondary breaker S1 is then open in order to interrupt this low residual current. The opening of S1 finalises the opening of the DC bus 12 and completely isolates the charge of the source.

In practice, the number of MOSFET components to be placed in parallel in the protection circuit B depends on the specific breakdown voltage of the components and of the constraints, in particular for voltage and inductance, of the DC bus.

As such, for a 600V/30 A bus, nine MOSFET components with CoolMOS (Registered Trademark) technology of the SPA17N80C3 type are used having a breakdown voltage of 800V for a bus with inductance of 3 mH, or fourteen such components for a bus with inductance of 5 mH. The number of MOSFET components required is therefore rather high for a high voltage bus.

Figure 7:
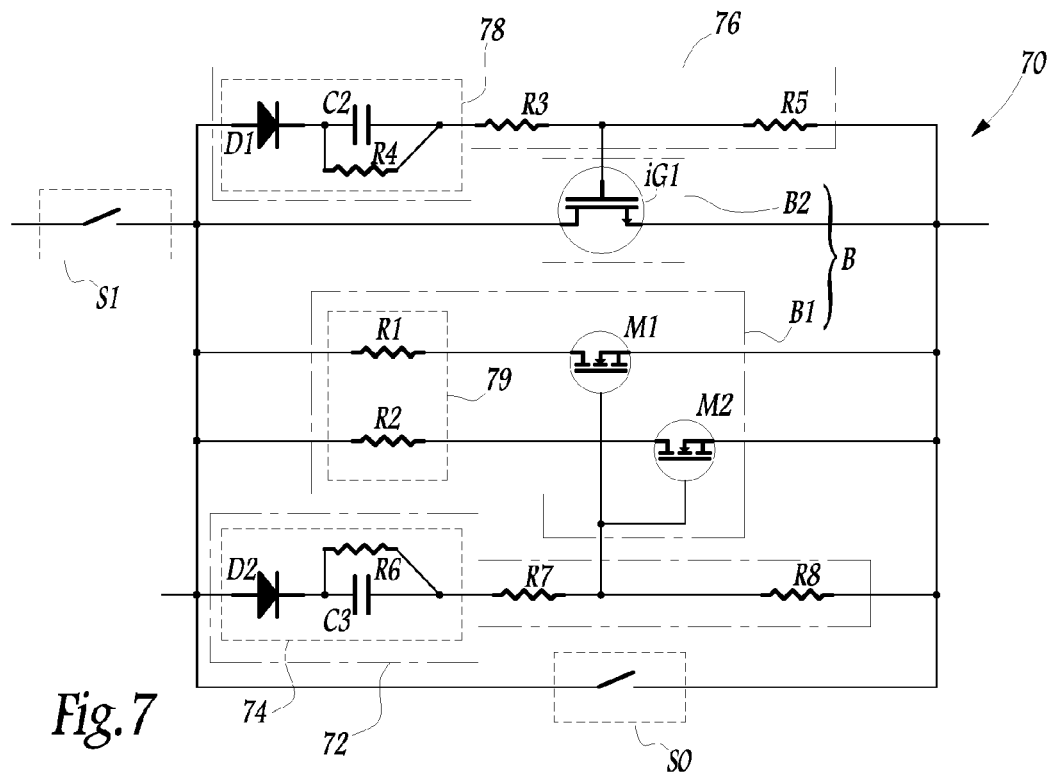
FIG. 7 is a diagram showing a second embodiment of a DC current interruption system according to the invention.

FIG. 7 shows a second embodiment of a DC current interruption system according to the invention, which is better suited for a high voltage DC bus as it requires a lesser number of MOSFET components in parallel.

In this embodiment, the interruption system combines transistors of the MOSFET type and an IGBT transistor ("Insulated Gate Bipolar Transistor").

The interruption system 70 comprises a first electronic opening system 72 with passive circuit 74, which is a self-biasing system with fast opening, able to actuate a first block B1 comprising two transistors of the first type, MOSFET transistors M1 and M2, mounted in parallel, and a second electronic opening system 76 with passive circuit 78, which is a self-biasing system with slow opening able to actuate a second block B2, comprised of one or several transistors of the second type, here a IGBT IG1 transistor. The blocks B1 and B2 form a circuit that is functionally equivalent to the protection circuit B.

Each of the passive circuits 74, 78 is comprised of a diode (D2, D1) mounted in series with a capacitor (C3 C2), a resistor (R6, R4) also being mounted in parallel with the capacitor, in a manner similar to the passive circuit 22 of FIG. 2.

The opening delay for forming a fast opening system, of which the capacitor is charged faster than that of the slow opening system, is controlled by the choice of the time constant for the control branch, for example 100 ns for the fastest, and 1.5 µs for the slowest, with the time constant obtained by a choice of suitable values for capacitance and resistance.

For example, C2=10 nF, R6=800 kOhms can be selected for the passive circuit 76, and C2=1 nF, R4=800 kOhms for the passive circuit 78. The diodes D1, D2 are selected to pass all of the current of the DC line in a very short time. For example, 1 kV, 30 A diodes are used.

Each electronic opening system 72, 76 further comprises resistors R3, R5 for the opening system 76, R7, 68 for the opening system 72, in a manner similar to the opening system 14 of FIG. 2. For example, the numerical values of these resistors take the following values: R3=50 Ohms, R5=1500 Ohms, R7=1 Ohms, R8=10 Ohms.

The first block B1 comprising MOSFET components is intended to limit the voltage and to prevent electric arcs, and the second block B2 allows for a limitation of faster current.

The first block B1 further comprises a balancing system 79 with resistors mounted in series at the drain of each transistor MOSFET, in a manner similar to the balancing system 24 of FIG. 2, and having the same function.

In operation, upon the opening of the primary breaker SO, the passive circuit 74 is charged and the gates of the MOSFET transistors of the block B1 are quickly charged. The MOSFET components start to operate in ohmic mode. During this time, the second passive circuit 78 is also charged, and the IGBT component of the second block B2 becomes passing.

The passive circuit 74 having reached its full charge, an interruption occurs, and the MOSFET M1 and M2 are also interrupted.

The IGBT component of the second block B2 takes over until the capacitor C2 of the passive circuit 78 is fully charged. Then, the IGBT component switches and substantially limits the current of the DC bus.

This substantial decrease in the current causes an overvoltage peak, which is absorbed by the MOSFET components which switch to breakdown mode when the voltage of the DC bus exceeds their breakdown voltage Vbr. As explained hereinabove in reference to FIG. 2, the balancing system 79 makes it possible to distribute the energy absorption between the various MOSFET transistors.

The operation in breakdown mode of the transistors makes is possible to prevent an operation in overvoltage of the IGBT component, and therefore to preserve this component.

After the breakdown event, the MOSFET transistors of the block B1 as well as the IGBT transistor of the block B2 are in interrupted mode, the current is reduced to a low residual current, which can easily be interrupted by the secondary breaker S1.

Figure 8:
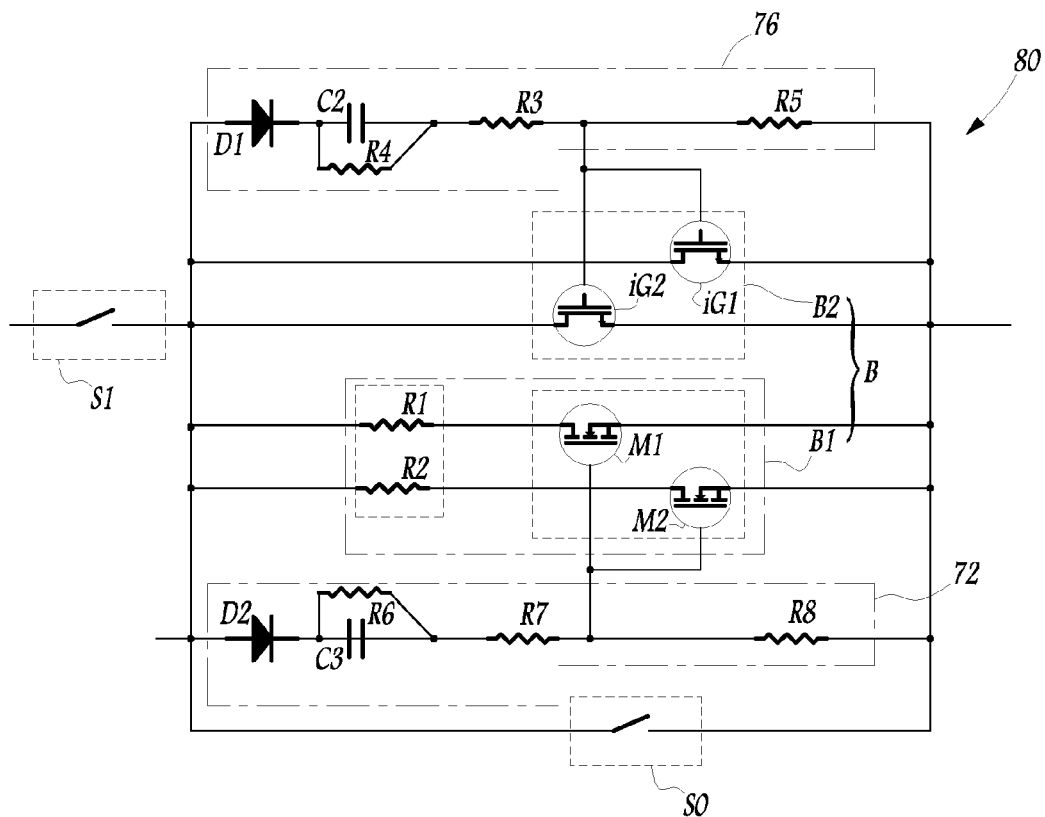
FIG. 8 is a diagram showing a third embodiment of a DC current interruption system according to the invention.

In a third embodiment shown in FIG. 8, the second block B2 of the interruption system 80 is formed of several IGBT mounted in parallel. Indeed, the interruption capacity of a single IGBT component, described in the SOA ("safe operating area") associated with the component, which specifies for how long a given electric power pulse can be applied to the IGBT, can be insufficient to absorb the transient current of the current bus.

The number of IGBT components to be inserted into the second block B2 depends on the constraints of the DC bus, and also on the breakdown voltages of the MOSFET transistors of the first block B1. In this embodiment, the voltage withstand of the IGBT components must be higher than the voltage Vbr of the MOSFET components. The voltage withstand of the MOSFET and their maximum breakdown energy must make it possible to dissipate the energy stored in the network.

As such, for example, one or several IGBT 1 KV 50 A can be taken associated with one or several MOSFET 900V 0.7 mJ (milli-Joules), in order to obtain a fast interruption.

FIG. 9 shows a fourth embodiment of an interruption system according to the invention, which is optimised in the number of components and in cost.

The interruption system 90 of FIG. 9 is similar to the interruption system 70 of FIG. 7, and comprises the primary S0 and secondary S1 breakers, fast 72 and slow 76 electronic opening systems, the blocks B1 and B2.

Contrary to the embodiment of FIG. 7, the block B2 further comprises a resistor R9 mounted in series with the collector of the IGBT component, in such a way as to assist with the switching of this component. Indeed, a portion of the energy in the conduction phase of the IGBT will be dissipated by the component R9, which makes it possible to reduce the constraints on the IGBT component and to replace the IGBT in a guaranteed operating mode.

The choice of the value for the resistor R9 is carried out according to the characteristics of the IGBT component. For example, a resistor R9=40 Ohms is chosen with a 25 A/1200 V IGBT component.

In practice, by using an interruption system 90 with resistance assistance in the switching of the IGBT components, two 1200V IGBT components (for example FGA20S120M components) can be used and two MOSFET components with breakdown voltage of 900V, for example IPP90R340C3 components. This topology makes it possible to reduce the cost of the interruption system in relation to the first embodiment, which would require six MOSFET components with breakdown voltage 900V mounted in parallel.

The interruption system 90 of FIG. 9 operated in a manner analogous to the interruption system 70 of which the operation has already been described in reference to FIG. 7.

The opening systems 72, 76 trigger the respective blocks B1 and B2, with firstly the transistors of B1 in ohmic mode, then the switching of the transistor or transistors IGBT of the block B2, finally the resuming of the block B1 with the MOSFET transistors in breakdown mode in order to finally reach a current close to zero.

The graph of FIG. 10 shows the change in the current of the bus shown by the curve 92, and of the voltage at the terminals of the primary breaker shown by the curve 94, according to time, when the interruption system of FIG. 9 is implemented. The curves were plotted using a 20V/2.5 A demonstrator, but the behaviour is similar for higher voltages.

The graph is divided into five phases, numbered P1 to P5.

In the first phase P1, upon the opening of the primary breaker S0 and of the charge of the electronic opening systems 72, 76, during a short period of time, the current and the voltage are at their nominal values.

Then, thanks to the electronic opening system with a fast passive circuit 72, the block B1 comprising MOSFET transistors switches to conduction in ohmic mode, the current decreases, the voltage increases during phase P2. The MOSFET transistors act in order to avoid the electric arc, while also slightly reducing the current.

The block B2 with IGBT components takes over in the following phase P3 in order to continue the limitation of the current, while the block B1 switches to non-conductive mode or blocked mode. The voltage continues to increase until it reaches the value of the breakdown voltage of the MOSFET components. At this moment, the MOSFET transistors of the block B1 switch to breakdown mode during the phase P4. The voltage remains stable during the breakdown, the direct current decreases.

Finally, the current reaches a low stable value during the phase P5. The voltage curve 94 shows a few oscillations before stabilising. The secondary breaker S1 can be actuated at any time in order to totally interrupt the current.

FIG. 11 shows a fifth embodiment of an interruption system 100 according to the invention, which makes it possible to further improve the protection against the appearance of electric arcs at the terminals of the mechanical contacts in relation to the embodiment of FIG. 9.

In this embodiment, the fast electronic opening system 72 is improved by adding a second branch comprising another passive circuit comprised of a diode D3 mounted in series with a capacitor or capacitance C4, a resistor R10 also mounted in parallel with the capacitor C4. By way of example, the values of the following components are recommended for currents greater than 3 A, the system operating with MOSFET components with breakdown voltage Vbr=900V: C4=500 nF, R10=800 kOhms. A diode D3 1 kV, 30 A is adapted to pass all of the current of the DC line during the time for putting the MOSFET components in conduction.

The adding of capacitance makes it possible to absorb a portion of the energy of the network at the first instants after the opening of the mechanical breaker S0, which makes it possible to prevent the initialisation of an electric arc during the time for putting the MOSFET components of the block B1 in conduction. The diode D3 and the resistor R10 control the discharge of the capacitor C4. This system makes it possible to better prevent the risk of an arc with a low extra cost in relation to the fourth embodiment, in particular for currents greater than 3 A.

As such, the various modes of carrying out a DC current line interruption system presented allow for the use of low-cost mechanical breakers and without substantial constraints on the sequencing of their respective openings, and semiconductor electronic components in order to prevent the electric arcs and the overvoltage due to the inductive behaviour of the DC line. The choice between the topology of the interruption system comprising solely transistors mounted in parallel or the topology using two blocks, a block of transistors of the first type, for example MOSFETs, and a block of transistors of the second type, for example IGBT, is according to the constraints of the DC bus.

The invention claimed is:

1. DC current interruption system for opening a DC line with inductive behaviour, comprising a primary mechanical breaker, a secondary mechanical breaker and an electronic overvoltage protection circuit comprising at least one transistor, further comprising an electronic opening system comprising a passive circuit to auto-bias the electronic overvoltage protection circuit upon the opening of said primary mechanical breaker, so as to trigger a switching of said at least one transistor making it possible to limit a voltage and a current in the DC line, with a total interruption of said DC line being obtained by subsequent opening of said secondary mechanical breaker,
   wherein said electronic overvoltage protection circuit comprises a plurality of field effect transistors mounted in parallel, switch to an ohmic mode in a first step after opening of said primary breaker, then to a breakdown mode in a second step when the voltage reaches a predetermined value, and
   said electronic overvoltage protection circuit further comprising a breakdown balancing system, making it possible to operate in breakdown mode quasi-simultaneously said plurality of field effect transistors.

2. DC current interruption system according to claim 1, wherein the breakdown balancing system comprises a resistor mounted in series with each field effect transistor.

3. DC current interruption system according to claim 1, wherein said electronic overvoltage protection circuit comprises a first block limiting the voltage comprising at least one transistor of the first type, and a second block limiting the current comprising at least one transistor of the second type.

4. DC current interruption system according to claim 3, wherein said second block comprises, for each transistor of the second type, a resistor mounted in series with said transistor.

5. DC current interruption system according to claim 3, comprising two electronic opening systems, i.e. a first electronic opening systems with fast self-biasing actuate said first block and a second electronic opening system with slow self-biasing actuate said second block, in such a way as to allow, upon the opening of said primary mechanical breaker, a limitation of the voltage by said first block followed by a limitation of current by said second block.

6. DC current interruption system according to claim 3, wherein, upon the opening of said primary breaker, the following phases are sequenced:

implementation of said first block by the electronic opening system with fast self-biasing, said at least one transistor of the first type operating in ohmic mode, implementation of said second block by the electronic opening system with slow self-biasing, said at least one transistor of the first type being in non-passing mode, implementation of said first block when the voltage reaches a predetermined value, said at least one transistor of the first type operating in breakdown mode.

7. DC current interruption system according to claim 3, wherein said transistor of the first type is a MOSFET transistor and said transistor of the second type is a IGBT transistor.

8. DC current interruption system as claimed in claim 1, wherein said electronic opening system comprises at least one passive circuit comprised of a diode mounted in series with a capacitor, and a resistor mounted in parallel with said capacitor.

9. DC current interruption system as claimed in claim 1, wherein a number of transistors mounted in parallel in said protection circuit is determined according to constraints in voltage, current and inductance of said DC line.

* * * * *